(12) United States Patent
Brammer et al.

(10) Patent No.: US 11,642,960 B2
(45) Date of Patent: May 9, 2023

(54) SYSTEM AND METHOD FOR A DIFFERENTIAL DISCONNECT ELECTRIC AXLE

(71) Applicant: Dana Heavy Vehicle Systems Group, LLC, Maumee, OH (US)

(72) Inventors: Andrew T. Brammer, Toledo, OH (US); Mark Leber, Holland, OH (US); Benjamin J. Passino, Maumee, OH (US); George A. Willford, Waterville, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 344 days.

(21) Appl. No.: 16/872,205

(22) Filed: May 11, 2020

(65) Prior Publication Data

US 2021/0347258 A1    Nov. 11, 2021

(51) Int. Cl.
| | |
|---|---|
| *B60K 17/356* | (2006.01) |
| *F16H 48/08* | (2006.01) |
| *B60K 17/02* | (2006.01) |
| *B60K 1/04* | (2019.01) |
| *B60K 17/35* | (2006.01) |
| *B60K 23/08* | (2006.01) |
| *F16D 11/14* | (2006.01) |
| *B60K 6/387* | (2007.10) |
| *B60K 6/52* | (2007.10) |
| *F16D 25/06* | (2006.01) |

(52) U.S. Cl.
CPC .............. *B60K 17/356* (2013.01); *B60K 1/04* (2013.01); *B60K 6/387* (2013.01); *B60K 6/52* (2013.01); *B60K 17/02* (2013.01); *B60K 17/35* (2013.01); *B60K 23/08* (2013.01); *F16D 11/14* (2013.01); *F16D 25/06* (2013.01); *F16H 48/08* (2013.01); *B60Y 2200/92* (2013.01)

(58) Field of Classification Search
CPC ........ B60K 17/356; B60K 1/04; B60K 6/387; B60K 6/52; B60K 17/02; B60K 17/35; B60K 23/08; B60K 6/48; B60K 17/16; B60K 17/12; F16D 11/14; F16D 25/06; F16H 48/08; B60W 50/0097; B60W 2510/244; B60W 2556/50; B60W 20/20; B60W 20/40; B60L 15/2036; B60L 2240/423

See application file for complete search history.

(56) References Cited

U.S. PATENT DOCUMENTS

| | | | |
|---|---|---|---|
| 8,042,642 | B2 | 10/2011 | Marsh et al. |
| 8,556,760 | B2 | 10/2013 | Mack et al. |
| 9,546,722 | B2 * | 1/2017 | Fox ........................ F16H 48/08 |
| 9,656,541 | B2 | 5/2017 | True et al. |
| 2014/0274538 | A1 | 9/2014 | Ziech |

(Continued)

FOREIGN PATENT DOCUMENTS

WO    2017172722 A1    10/2017

*Primary Examiner* — David R Morris
(74) *Attorney, Agent, or Firm* — McCoy Russell LLP (57) ABSTRACT

Methods and systems are provided for selectively engaging an electric machine to an electric axle of a vehicle. In one example, a method may include engaging or disengaging the electric machine to a differential of the electric-axle by adjusting pressure in a piston coupled to an axle shaft of the electric-axle via a disconnect clutch.

14 Claims, 5 Drawing Sheets

(56) References Cited

U.S. PATENT DOCUMENTS

| | | | |
|---|---|---|---|
| 2014/0335995 A1* | 11/2014 | Swales | B60K 6/485 |
| | | | 477/3 |
| 2018/0051786 A1* | 2/2018 | Krishnan | B60K 17/3462 |
| 2019/0283556 A1* | 9/2019 | Yamaguchi | B62D 25/06 |
| 2020/0248790 A1* | 8/2020 | Houser | B60K 17/22 |
| 2020/0317064 A1* | 10/2020 | Lee | B60K 17/356 |

\* cited by examiner

SYSTEM AND METHOD FOR A DIFFERENTIAL DISCONNECT ELECTRIC AXLE

FIELD

The present description relates generally to methods and systems for selectively engaging an electric machine to an electric axle.

BACKGROUND AND SUMMARY

Vehicle manufacturers continually strive to improve fuel economy and reduce emissions while meeting customer expectations for performance and drivability. A hybrid powertrain may be powered by a combination of an internal combustion engine and an electric machine, such as an electric machine. The hybrid powertrain may further include an energy storage device to power the electric motor. As an example, the engine may be coupled to a first axle of the vehicle and the electric machine may be coupled to a second axle of the vehicle, also referred as an e-axle. The electric machine may provide tractive torque to the second axle of the vehicle for enabling an electric mode of vehicle operation. The electric machine and the engine may be operated independently or in combination pursuant to the operating conditions of the vehicle and state of charge of the energy storage device.

The inventors herein have recognized potential issues with the electric machine being attached to the e-axle of the vehicle at all times. During certain vehicle operating conditions, such as when the vehicle is solely propelled via engine torque and power from the electric machine is not desired, the electric machine may operate in a regenerative mode where a portion of the engine power is used to charge the energy storage device coupled to the electric machine. However, the energy storage device may be completely charged and further efforts to charge the module may cause degradation to the electronic components of the energy storage device and the electric machine.

In one example, the issues described above may be addressed by a method for an electric-axle, comprising: selectively engaging an electric machine to a differential of the electric-axle by adjusting pressure in a piston coupled to a first axle shaft of the electric-axle via a disconnect clutch. In this way, by including a pressure actuated piston to engage or disengage a disconnect clutch, the electric machine may be selectively connected or disconnected to the electric axle.

As one example, an electric machine may be coupled to an axle of a vehicle, the electric machine transmitting torque to the vehicle wheels via a differential. The electric machine may be coupled to the differential via a disconnect clutch. The disconnect clutch may be engaged to the differential via a pressure actuated piston. Upon conditions being met for coupling of the electric machine to the axle, the piston may be pressurized causing the piston to move in one direction which engages the disconnect clutch to a stub shaft which may mechanically couple an axle shaft to the differential. Conditions for coupling the electric machine to the axle may include, a desire to drive the axle via the electric machine (to operate the vehicle at least partly using machine torque) or to charge the energy storage device coupled to the electric machine. Once the electric machine is engaged to the axle, a change may be observed in the torque transmitted to the axle. A degradation of the actuation mechanism may be indicated in response to an absence of any change in electric machine speed. Upon conditions being met for decoupling of the electric machine to the axle, the piston may be depressurized and the return spring may extend to push the piston in another direction and decouple the disconnect clutch from the stub shaft, thereby disconnecting the electric machine from the axle of the vehicle. Once the electric machine is disconnected, the e-axle may operate as a tag axle without influencing torque delivery to the vehicle wheels.

In this way, by connecting an electric machine to a vehicle axle via a disconnect clutch, the electric machine may be selectively coupled/decoupled from a differential. During conditions when the energy storage device is fully charged, the technical effect of decoupling the electric machine from the differential is that the electronic components of the electric machine and the energy storage device may not be degraded due to attempts to further charge the energy storage device. Further, by changing an e-axle to a tag axle during an unsuccessful coupling attempt, degradation of components of the actuation mechanism may be reduced. Overall, by using a pressure actuated piston system for selectively coupling/decoupling an electric machine, operation of the e-axle may be improved and longevity of the mechanical and electronic components may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4 are shown to scale, although other relative dimensions may be used, if desired.

DETAILED DESCRIPTION

Figure 1:
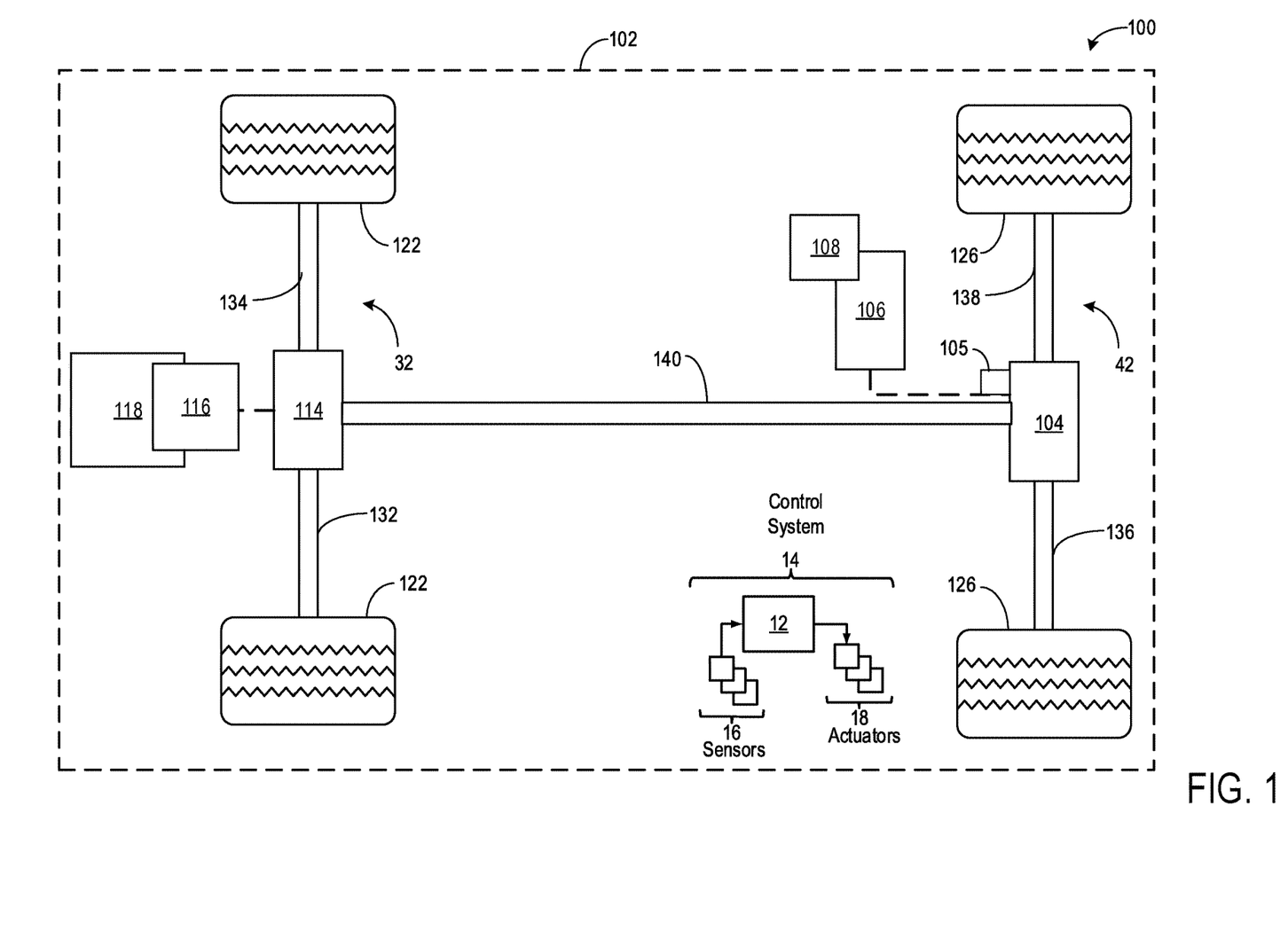
FIG. 1 shows a hybrid powertrain arrangement of a vehicle including an electric-axle.
Figure 2:
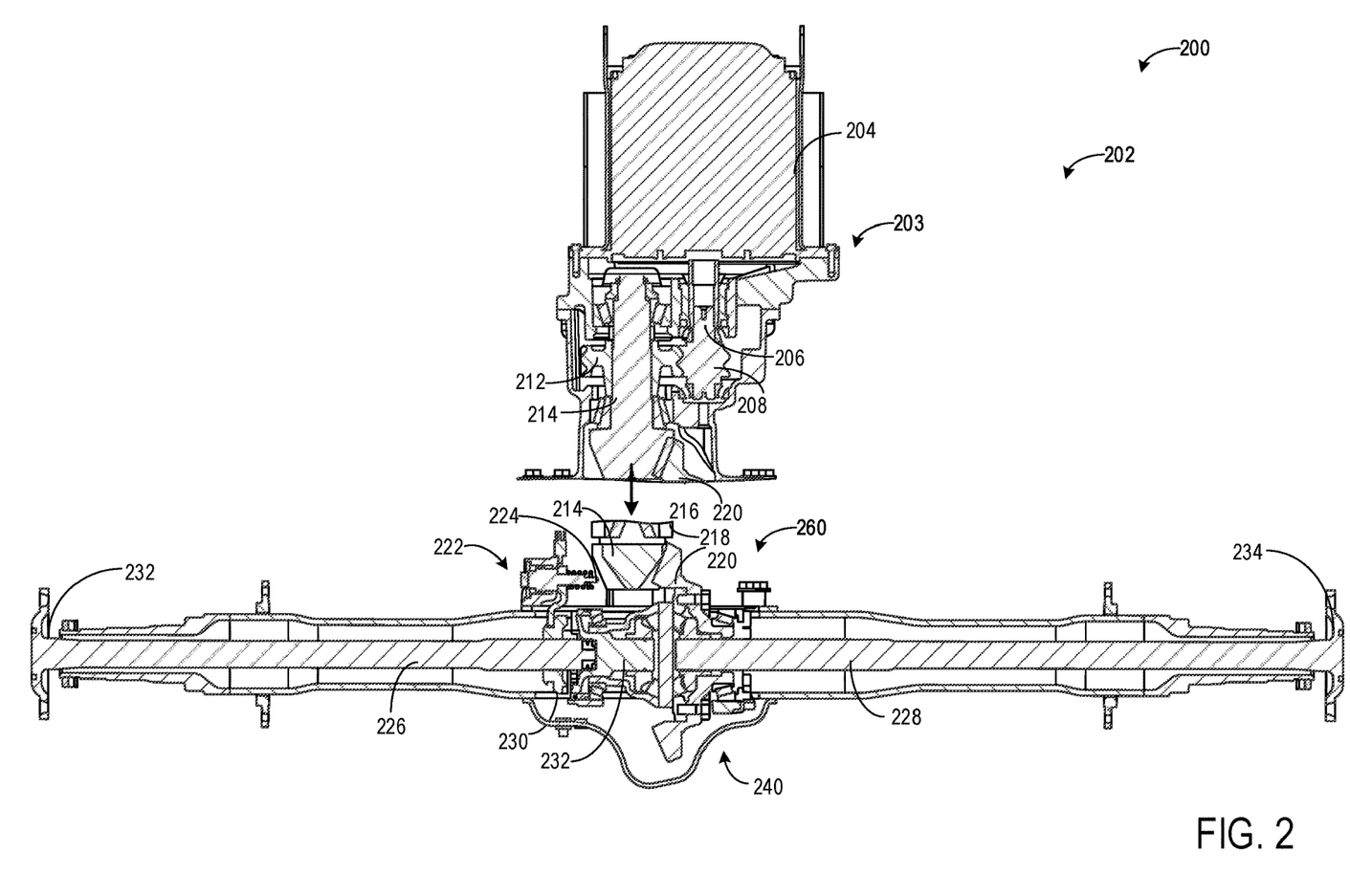
FIG. 2 shows an electric-axle including an electric machine coupled to a differential.

The following description relates to systems and methods for controlling engagement of an electric machine to an electric axle of a vehicle via a differential. An example hybrid vehicle powertrain arrangement including an electric-axle is shown in FIG. 1. The electric-axle with an electric machine coupled to a differential is shown in FIG. 2. The electric machine may be selectively engaged to the differential via an actuation mechanism, such as a pressure actuated piston system shown in FIGS. 3 and 4. Based on operating conditions of the vehicle and the electric machine, a vehicle controller may selectively engage the electric machine to the differential, such as via the control routine of FIG. 5.

FIG. 1 shows an example embodiment 100 of a hybrid vehicle 102 including a four-wheel powertrain. The vehicle 102 may include a first powered driveline 32 and a second powered driveline 42. The first powered driveline 32 may include an internal combustion engine 118 connected to a first differential unit 114 via a transmission 116. Engine power may be delivered to the first differential unit 114 through the transmission 116. The drive torque delivered to first differential unit 114 may be transferred through axleshafts 132 and 134 to front wheels 122. The drive torque from the engine may be further transferred to rear wheels 126 via a drive shaft 140 and a second differential unit 104.

The second powered driveline 42 includes an electric machine 106 connected to a second differential unit 104 via an actuation mechanism 105 for selectively engaging the electric machine 106 to the second differential unit 104. The actuation mechanism 105 includes a disconnect clutch actuated via a pressure actuated piston. The electric machine 106 may be powered by an energy storage device such as a battery. The electric machine 106 may also operate in a regenerative mode where a portion of the engine power is used to charge the energy storage module. In the regenerative mode, a portion of the engine torque used to rotate the axleshafts 136 and 138 may be used to rotate the electric machine 106, which may result in charging the energy storage device 108 coupled to the electric machine 106.

Based on vehicle operating conditions and a demand for torque output by the electric machine 106, machine power may be delivered to the second differential unit 104. The drive torque delivered to second differential unit 104 may be transferred through axleshafts 136 and 138 to rear wheels 136. The axleshafts 136 and 138 powered by the electric machine 106 may constitute an electric-axle (also referred herein as an e-axle). The drive torque from the electric machine 106 may be further transferred to the front wheels 122 via the drive shaft 140 and the first differential unit 114.

Based on a vehicle operating conditions and a state of charge of the electric storage device 108, the electric machine may be selectively engaged to the second differential unit 104. In one example, in response to conditions being met for vehicle operation at least partially via torque supplied from the electric machine 106, the electric machine may be engaged to the second differential unit 104. In another example, during vehicle operation via torque supplied from the engine, in response to a state of charge of the energy storage device 108 powering the electric machine 106 being higher than a threshold charge, the electric machine may be disengaged from the second differential unit 104. The second differential unit 104 may include a ring gear engaged to a shaft of the electric machine, one or more spider gears mounted on the ring gear, a first side gear coupled to one end of a stub shaft and meshed with the one or more spider gears, and a second side gear coupled to one end of a second axle shaft and meshed with the one or more spider gears, the second differential unit 104 positioned between a first axle shaft and the second axle shaft. Engaging the electric machine 106 may include increasing air pressure in a piston of an actuation mechanism to move a stem coupling the piston to the a clutch mounted at one end of the first axle shaft in a first direction to engage the disconnect clutch to splines of the stub shaft, and then activating the electric machine to rotate the ring gear via rotation of the shaft. Disengaging the electric machine 106 may include, reducing air pressure in the piston to decompress a return spring coiled around the piston and move the stem in a second direction to disengage the disconnect clutch from the splines of the stub shaft, the second direction opposite to the first direction. Details of the actuation mechanism for engagement of the electric machine 106 to the differential unit 104 is discussed in relation to FIGS. 2-4.

During conditions when the electric machine 106 is disconnected from the second differential unit 104, the engine provides torque to both the first differential unit 114 and the second differential unit 104 while the axleshafts 136 and 138 constitute a tag axle. A tag axle may increase the support of the chassis at the rear of the vehicle, allowing for greater carrying capacity and shock resistance.

Vehicle 102 may further include control system 14. Control system 14 is shown receiving information from a plurality of on-board sensors 16 and sending control signals to a plurality of on-board actuators 18. As one example, sensors 16 may include a plurality of pressure, temperature, air/fuel ratio, and composition sensors coupled to various locations in vehicle 102. Also, sensors 16 may include sensors coupled to the electric machine 106 and the energy storage device 108 to sense a speed of rotation of the electric machine 106 and a state of charge of the energy storage device 108. In addition, sensors coupled to the exterior of the vehicle system such as rain sensor (windshield sensor) and temperature sensor may be used to estimate ambient conditions. One or more cameras may be coupled to the vehicle exterior and/or on the dashboard of the vehicle cabin to capture images of the road ahead of the vehicle.

The actuators 18 may include, for example, a plurality of valves, fuel injectors, throttle, spark plug, etc. The actuators may further include a pressure actuated piston of an actuation mechanism selectively engaging the electric machine 104 to the electric-axle. The control system 14 may include a controller 12. The controller 12 may receive input data from the various sensors, process the input data, and trigger various actuators in response to the processed input data based on instruction or code programmed therein corresponding to one or more routines.

FIG. 2 shows an example schematic 200 of an electric-axle 202 including an electric machine assembly 203 coupled to a differential 240 and a gearbox 260. The electric machine assembly 203 may include an electric machine 204 which drives a first shaft 206 via a rotor. The first shaft 206 driven by the electric machine 204 may drive a first gear 208. The first gear 208 may drive a second gear 212 coupled to a second shaft 214. The second shaft 214 may be in face sharing contact with a ring gear 220 of the differential 240. In this way, rotation of the electric machine 204 results in rotation of the first shaft 206 and the second shaft 214 which in turn engages the ring gear 220 of the differential 240. The second shaft 214 may be the pinion gear of the differential 240 such that upon rotation of the electric machine 204, the ring gear 220 may also rotate via the second shaft 214. The second shaft 214 may be coupled to upper portion of the differential 240 via nuts and bolts coupled to an interface 218.

The e-axle 202 may include a first axle shaft 226 coupled to the differential 240 via a stub shaft 232 at one end and to a wheel at another end 232. The e-axle 202 may further include a second axle shaft 228 coupled to the differential 240 at one end and to another wheel at another end 234.

The stub shaft 232 may be a shorter shaft relative to the first axle shaft 226. The stub shaft 232 may be selectively coupled to the first shaft at a first end via a disconnect clutch 230 of the gearbox 260. The first end of the stub shaft 232 may include splines that may be engaged (such as interlocked) with the teeth of the disconnect clutch 230. The other end of the stub shaft 232 may be engaged within the differential 240.

The differential 240 may be operated in a first mode with the splines of the stub shaft 232 interlocked with the disconnect clutch 230. Upon coupling the stub shaft 232 to the first axle shaft 226, the first axle shaft 226 may be mechanically coupled to the ring gear 220 of the differential 240. Therefore, in the first mode, electric machine torque may be delivered to the first axle shaft 226 via the differential 240 and the stub shaft 232. The gear arrangement between the disconnect clutch 230, the stub shaft 232 and the ring gear 220 is further elaborated in FIG. 2. In the first mode, the first axle shaft 226 and the second axle shaft 228 may be rotating in the same direction (the speed of rotation of the first axle shaft 226 may be different from that of the second axle shaft 228) and the electric machine 204 is connected to e-axle. Therefore, during operation in the first mode, the electric machine 204 and the ring gear 220 are rotated, and the first axle shaft 226 and second axle shaft 228 form an e-axle.

The differential 240 may be operated in a second mode with the splines of the stub shaft 232 decoupled from the disconnect clutch 230. Upon decoupling the stub shaft 232 from the first axle shaft 226, the first axle shaft 226 may no longer be mechanically coupled to the ring gear 220 of the differential 240. Due to the decoupling of the stub shaft 232 from the disconnect clutch 230, power is no longer transmitted through the stub shaft 232 to the first axle shaft 226. In this mode, the differential 240 may differentiate within itself and cause the second axle shaft and the stub shaft 232 to spin at the same speed but in opposite directions without rotation of the ring gear while maintaining the ring gear 220 stationary. The first axle shaft and the second axle shafts may continue to spin in the same directions (at same or different speeds). In this way, the differential may be held still allowing relative motion between two axle shafts. In the second mode, the electric machine 204 may not be operated and the first axle shaft 226 and the second axle shaft 228 may together form a tag axle.

The operation of the differential in the first mode includes engagement of the electric machine 204 to the differential 240 that allow for operation of the first axle shaft 226 and the second shaft 228 as the electric-axle 202. While, in the second mode, the electric mot machine or 204 is no longer coupled to the first axle shaft 226 via the differential 240, and the first axle shaft 226 and the second axle shaft 228 may no longer form an electric-axle. In the first mode, the vehicle is either propelled at least partially via electric machine torque or the energy storage device coupled to the electric machine 204 may be charged. Rotation of the electric-axle (first axle shaft 226 and the second axle shaft 228) while the electric machine is engaged may rotate the rotor of the electric machine, which may result in charging the energy storage device with a certain reduction of vehicle speed as the charging may increase a load of the vehicle. A portion of the energy generated by the engine that would be used to solely rotate the axle may be used to rotate the rotor of the electric machine, thereby reducing speed of rotation of the electric-axle. In the second mode, by decoupling the electric machine 204 from the differential 240, drag losses during conditions when boost torque is not desired (such as when the vehicle is traveling down a slope) is reduced and overcharging of the energy storage device is averted.

Engagement of the electric machine 204 to the differential 240 is facilitated via an actuation mechanism 222 including a pressure actuated piston 225. The piston 225 may include a pressure inlet via which pressurized air may be supplied to the piston 225. The pressurized air may be supplied to the pressure inlet from an on-board air tank storing compressed ambient air to be used in vehicle systems (such as air brakes, suspension systems, etc.).

In the presence of positive pressure airflow through the piston 225 the piston may be pushed in a first direction, compressing a spring mounted on the piston. A stem connecting the piston 225 to the disconnect clutch 230 may also be pushed in the first direction causing the disconnect clutch 230 to move towards the stub shaft 232. Upon contact, the disconnect clutch 230 may interlock with the splines of the stub shaft 232. Once the spines are interlocked with the disconnect clutch, the first axle shaft 226 may be mechanically coupled to the differential. In the absence of air flow through the pressure inlet into the piston 225, the return spring may be de-compressed causing the piston to move a second direction, opposite to the first direction causing the stem coupled to the disconnect clutch 230 to recede. As the stem recedes, the splines of the stub shaft 232 are decoupled from the disconnect clutch 230. When the differential is operating in the first mode, air flow through the piston 225 is enabled to interlock the disconnect clutch 230 to the stub shaft 232, and the electric machine is coupled to the differential 240 to either transmit power to the wheels or charge the energy storage device. When the differential is operating in the second mode, air flow through the piston 225 is suspended to decouple the disconnect clutch 230 from the stub shaft 232, and the electric machine is no longer coupled to the differential 240.

Figure 3:
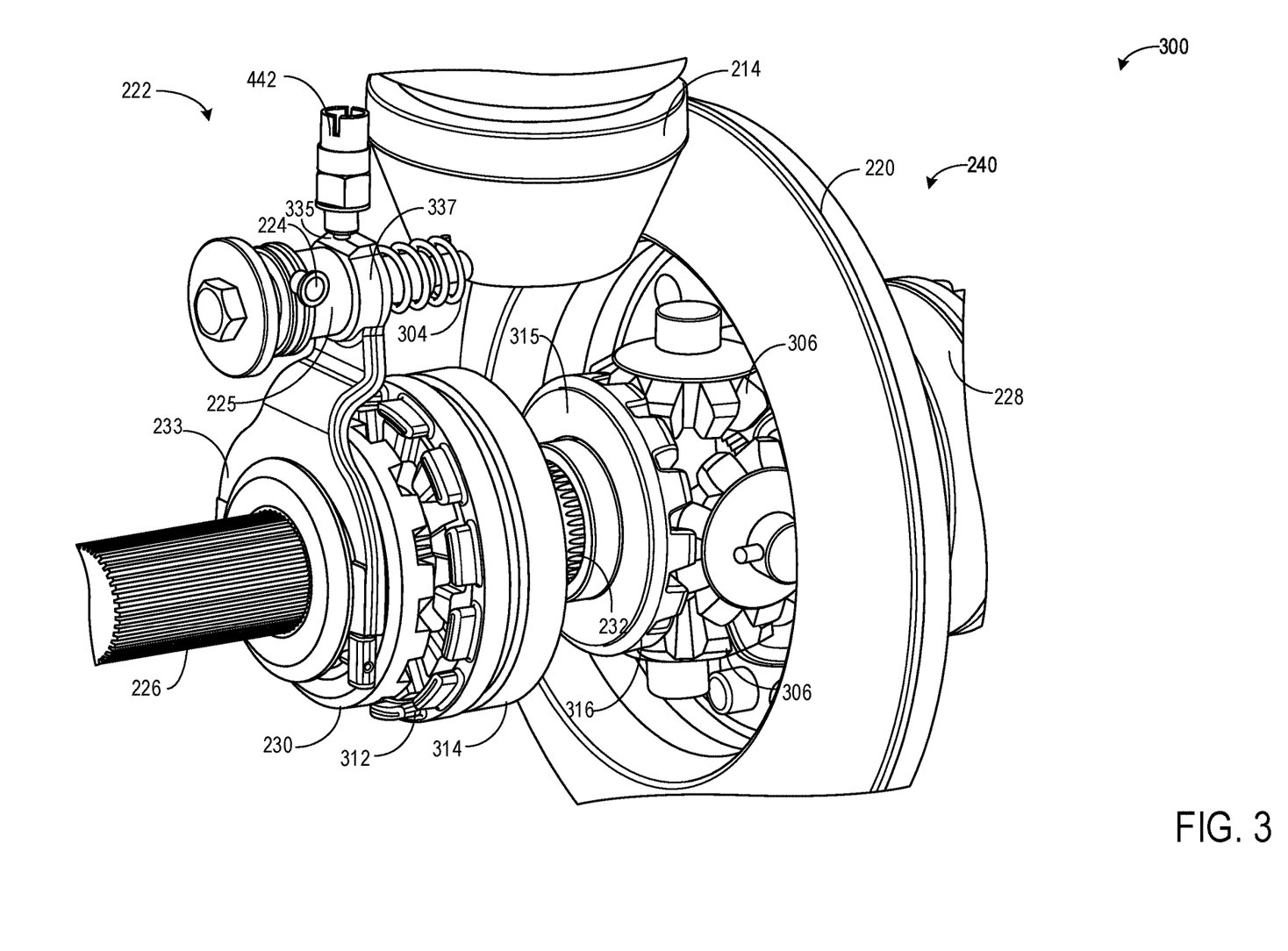
FIG. 3 shows an actuation mechanism for selective engagement of the electric machine of FIG. 2 to the differential.

FIG. 3 shows an example 300 of an actuation mechanism 222 for selective engagement of an electric machine to a differential 240 coupled to an electric-axle of a hybrid vehicle system. The differential may include a ring gear 220 which receives power from the electric machine via a shaft 214 which acts as a pinion gear for the differential 240. The differential may include one or more spider gears 306 mashed with at least two side gears. The spider gears 306 are mounted on the ring gear 220 such that a spider gear 306 may rotate with the ring gear and also rotate about its own axis.

A first axle shaft 226 includes a disconnect clutch 230 at one end distal from the wheels. The disconnect clutch 230 may be a dog clutch that may be interlocked with splines 312 at a first end 314 of a stub shaft 232. The disconnect clutch 230 may be slidable over the first axle shaft 226 via a stem 233 connected to the actuation mechanism 222. The second end 315 of the stub shaft 232 may include a first side gear 316 meshed with the spider gears 306 of the differential 240. A second side gear coupled to the second axle shaft 228 may also be meshed with the spider gears 306 of the differential 240. Relative rotation of the spider gear 306 with the ring gear 220 is translated to the first and second side gears and the two side gears may rotate at different speeds. Power from the electric machine is transferred may be the side gears via the spider gears 306.

Figure 4:
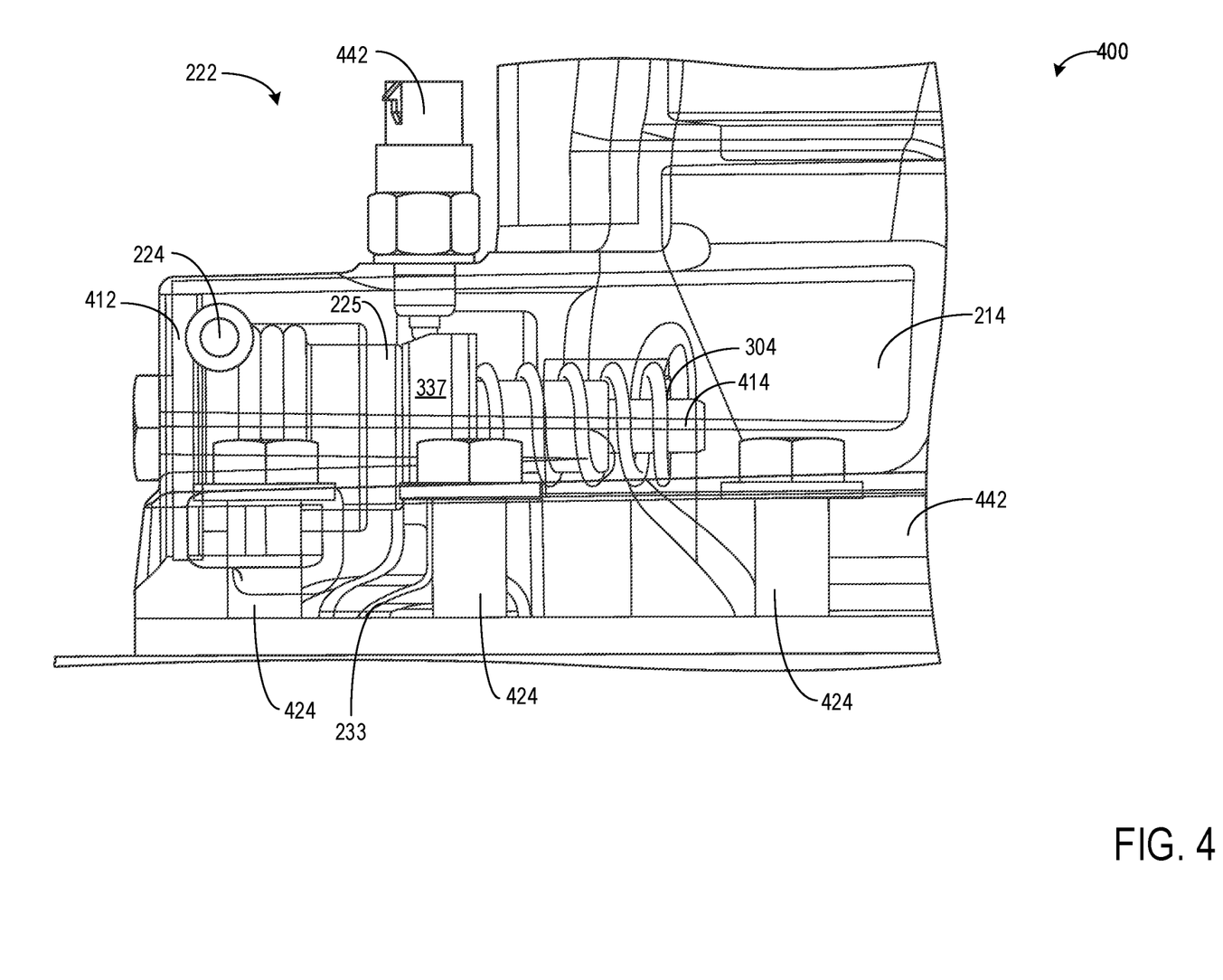
FIG. 4 shows a view of a pressure actuated piston system used for engagement of the electric machine of FIG. 2.

An example 400 of the actuation mechanism 222 for engagement of the electric machine to the differential 240 including a pressure actuated piston system is further shown in FIG. 4. The actuation mechanism 222 may include an inlet 224 on one side for pressurized air to enter a piston 225. The inlet 224 may include a valve that may be selectively actuated to an open position to supply pressurized air into the piston or a closed position inhibiting air flow into the piston. In alternate embodiments, the inlet 224 may be coupled to any portion of the piston 225. The body of the piston 225 may taper from a left end 412 to a right end 414. A return spring 304 may be coiled around the piston 225 towards the tapering right end 414 of the piston 225. A bracket 337 may encircle the body of the piston chamber to the left of the return spring 304. The stem 233 may originate from the bracket 337 and terminate at the disconnect collar 230. In this way, the stem 233 may mechanically couple the piston 225 to the disconnect collar 230. A plurality of bolts 424 may be used to support the piston 225 within the actuation mechanism 222. In one example, the actuation mechanism 222 may be enclosed in a housing.

The return spring 304 may be in a first position, compressed towards the right end 414 of the piston or in a second position, relaxed towards the left end of the piston 412. The return spring 304 may be in the first position in response to pressurized air being supplied to the piston 225 via the inlet 224 causing the piston to be pushed towards the right end 414, thereby compressing the spring 304. The return spring 304 may be in the second position in response to pressurized air not being supplied to the piston 225 via the inlet 224. The spring 304 may be shifted from the first, compressed position to the second position by disabling flow of pressurized air through the inlet 224 which may cause the piston to retreat towards the left, thereby decompressing the spring 304. Also, the spring 304 may be shifted from the second position to the first position by enabling flow of pressurized air through the inlet 224.

The piston may be in a first position when the pressurized air is supplied to the piston causing the piston to move to the right. When the piston is in the first position, the stem 233 may be shifted towards right causing the disconnect clutch 230 to also be shifted to the right of the splines 312, thereby interlocking the disconnect clutch 230 with the spline 312. In the interlocked condition, the first axle shaft is coupled to the differential via the stub shaft 232 and power is transmitted from the electric machine to each of the first axle shaft and the second axle shaft through the differential 240. Rotation of the shaft 214 of the electric machine causes power to be transmitted to the ring gear 220 of the differential which in turn transfers the power to the spider gears 306 mounted on the ring gear 220 and then onto the side gears 316 of the axle shaft causing the first and second axle shafts to rotate in coordination. In this way, by connecting an electric machine to a vehicle axle via a disconnect clutch, the electric machine may be selectively coupled/decoupled from a differential such that the energy storage device may not be degraded due to attempts to further charge the energy storage device.

The piston may be in a second position when the pressurized air is not supplied to the piston causing the return spring to be decompressed and the piston moving to the left. When in the second position, as seen in FIG. 3, as the piston shifts to the left, the stem is shifted towards left end 412 of the piston 225 causing the disconnect clutch 230 to also be shifted to the left of the splines 312, thereby unlocking the disconnect clutch 230 from the spline 312. In the unlocked condition, the first axle shaft is no longer coupled to the differential and the transmission of power through the differential may be suspended. As the transmission of power is suspended, the ring gear and the second shaft 214 of the electric machine may not rotate, thereby causing disengagement of the electric machine from the differential and the axle shaft. The electric machine may no longer supply power to the axle shafts. Since the electric-axle is no longer coupled to the electric machine, engine power may no longer be transmitted to the electric machine for charging the energy storage device powering the electric machine. The first and the second axle shafts may rotate in without transmission of machine power through the axle shaft. The rotation of the second axle shaft may cause the stub shaft to rotate in a direction opposite to the direction of rotation of the second axle shaft while the ring gear is maintained stationary. The electric axle may then become a tag axle.

Returning to FIG. 3, a position of the piston such as the first position of the piston when the disconnect clutch is interlocked with the stub shaft and the second position of the piston when the disconnect clutch is decoupled from the stub shaft may be indicated to the vehicle operator via an indication in the dashboard. A mechanical switch 442 may be in contact (ride on) a ramp 335 on the outer diameter of the piston 225. Based on the position of the piston, the mechanical switch 442 may provide a feedback signal which is communicated on the dashboard to show if the electric machine is connected to the electric-axle or if the electric motor is disconnected (electric axle working as a tag axle). As an example, a light in the dashboard may be illuminated only when the electric machine is coupled to the electric-axle.

In this way, the components of FIGS. 1-4 enable a system for an electric-axle in an vehicle, comprising: a differential coupled to the electric-axle between a first axle shaft and a second axle shaft, a controller with computer-readable instruction stored on non-transitory memory thereof that when executed enable the controller to: operate the differential in a first mode with an electric machine mechanically coupled to each of the first axle shaft and the second axle shaft via a ring gear of the differential, the ring gear coupled to the first axle shaft via a stub shaft interlocked with a disconnect clutch, and operate the differential in a second mode without electric machine mechanically coupled to each of the first axle shaft and the second axle shaft, the ring gear detached from the first axle by decoupling of the stub shaft and the disconnect shaft. The differential may be operated in the first mode during operation of the vehicle at least partially via torque delivered to the differential from the electric machine or during charging of a battery coupled to the electric machine from a portion of torque delivered to the differential from an engine, and the differential may be operated in the second mode during operation of the vehicle via torque delivered to the differential from the engine without charging the battery.

Figure 5:
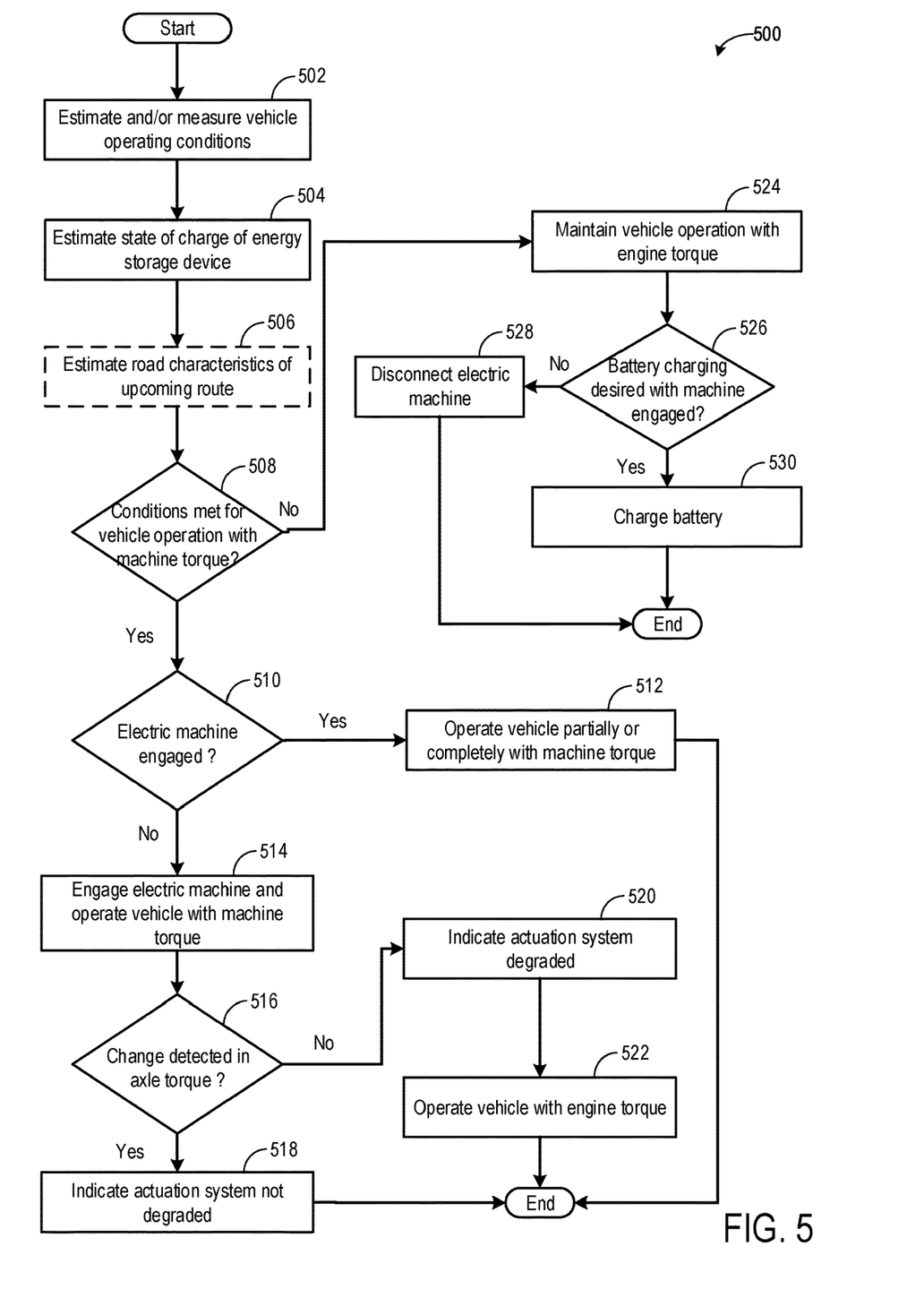
FIG. 5 shows a flow-chart illustrating an example method for selective engagement of an electric machine to a differential.

FIG. 5 shows an example method 500 for selectively engage an electric machine (such as electric machine 204 in FIG. 2) to a differential (such as differential 240 in FIG. 2) coupled to an electric axle of a hybrid vehicle (such as vehicle 102 in FIG. 1). The vehicle may be propelled via engine torque, machine torque, or a combination of engine torque and machine toque. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the vehicle system to adjust engine operation, according to the methods described below.

The method begins at 501 and includes estimating and/or measuring vehicle and engine operating conditions. The operating conditions may include vehicle speed, engine speed and/or load, engine temperature, exhaust temperature, gas pressures, mass air flow, etc. The vehicle location may be determined based on inputs from an onboard navigation system and/or from an external server. Further, ambient conditions such as ambient temperature, pressure, and humidity may be estimated.

At 504, a state of charge (SOC) of an energy storage device (such as the energy storage device 108 in FIG. 1, also referred herein as battery) powering the electric machine may be estimated. At 506, road characteristics of an upcoming road segment may be optionally estimated. The road characteristics estimated may include slope, speed limit, traffic conditions, etc. As an example, the road characteristics may be obtained from an onboard navigation system such as a global positioning system (GPS), a network cloud, a vehicle to vehicle (V2V) or an infrastructure of vehicle (I2V) connected network based on a destination of travel as indicated by the operator or as predicted by the controller based on a travel history of the operator. Step 506 may be an optional step and may not be carried out.

At 508, the routine includes determining if conditions are met for the vehicle to be propelled via torque from electric machine. The vehicle may be either propelled solely via electric machine torque, via a combination of engine torque and electric machine torque, or solely via engine torque. Conditions where the vehicle may be at least partly propelled via electric machine torque may include a lower than threshold torque demand and a higher than threshold SOC of the battery. The threshold torque demand may be pre-calibrated based on the maximum torque that may be delivered by the electric machine at the estimated SOC of the battery. As an example, the estimated road conditions in the upcoming route may be considered to predict the torque demand during travel in the upcoming road segment. In one example, the torque demand may be higher if the upcoming route includes climbing a steep slope such as a hill. The threshold SOC may be the minimum SOC of the battery needed for operation of the vehicle.

If it is determined that conditions are met for vehicle operation at least partially via torque supplied by the electric machine, the routine may proceed to step 510. The vehicle may be operated via electric machine torque if the current or upcoming torque demand is lower than the threshold torque demand and the SOC of the battery is higher than the threshold SOC. At 510, the routine includes determining if the electric machine is engaged to the differential coupled to an electric-axle of the vehicle. The electric-axle of the vehicle may include a first axle shaft (such as first axle shaft 226 in FIG. 2) coupled to the differential via a stub shaft and a second axle shaft (such as second axle shaft 228 in FIG. 2) directly coupled to the differential.

When the electric machine is engaged to the e-axle via the differential, splines of a stub shaft (such as stub shaft 232 in FIG. 2) may be interlocked with a disconnect clutch (such as disconnect clutch 230 in FIG. 2) to mechanically couple the first axle shaft to the differential. In order to keep the disconnect clutch interlocked with the stub shaft, a piston of an actuation mechanism (such as actuation mechanism 222 for the electric mechanism as shown in FIGS. 2-4) may be supplied with pressurized air to retain the disconnect clutch in the interlocked position with the stub shaft. The pressurized air causes the piston to be moved in one direction such that a stem coupled to the disconnect clutch is pushed towards the splines of the stub shaft, thereby facilitating interlocking of the disconnect clutch with the splines of the stub shaft. A shaft (such as a second shaft 214 in FIG. 2) of the electric machine may operate as a pinion for a ring gear of the differential and as the first axle shaft is mechanically coupled to the differential via the disconnect clutch, torque from the electric machine may be transferred to the two axle shafts via the differential.

When the electric machine is disengaged from the e-axle, splines of a stub shaft may be disconnected from the disconnect clutch to mechanically decouple the first axle shaft from the differential. In order to keep the disconnect clutch disconnected from the stub shaft, air supply to the piston of the actuation mechanism may be suspended. In the absence of pressurized air, the return spring causes the stem coupled to the disconnect clutch to move away from the splines of the stub shaft, thereby maintaining the disconnect clutch decoupled from the splines of the stub shaft. Due to the first axle shaft being disconnected from the differential, the electric machine may no longer transfer torque to the axle shafts via the differential and is therefore disengaged from the e-axle.

If it is determined that the electric machine is already engaged to the e-axle via the differential, at 512, the vehicle may be partially or completely operated with machine torque. Operating with machine torque includes transmitting power from the electric machine to the differential via a shaft coupled to the electric machine and then the power may be supplied to the wheels via the two axle shafts coupled to a first set of wheels. The drive torque from the electric machine may be further transferred to a second set of wheels via a drive shaft and another differential unit coupled to the second set of wheels.

If it is determined that the electric machine is not already engaged to the e-axle, at 514, the electric machine may be engaged to the e-axle via the differential. In order to transmit power from the electric machine to the two axle shafts, the first axle shaft is to be engaged with the stub shaft which is coupled to the differential for power transfer from the electric machine to the axle shafts. The controller may send a signal to an actuator at an inlet of the piston to open the inlet and allow pressurized air to enter the piston. Also, flow of pressurized air from the vehicle's on-board air system to the inlet may be started. A pressure is built in the piston of the actuation mechanism by the supply of pressurized air to the piston via the air inlet. Once the air pressure in the piston reaches a higher pre-determined pressure level, the piston is moved in a first direction that pushes a stem coupled to disconnect clutch to be pushed in the first direction towards the splines of the stub shaft. Upon contact of the disconnect clutch and the splines of the stub shaft, the disconnect clutch may be interlocked with the splines of the stub shaft. The movement of the piston in the first direction may cause the return spring to be compressed. Upon engagement of the disconnect clutch and the stub shaft, the flow path for torque to reach the axle shafts from the electric machine is completed. The electric machine may then be operated to supply torque to the axle shafts via the differential. Operating the vehicle with electric machine torque includes transmitting power from the electric machine to the differential and then supplying the power to the wheels via axle shafts coupled to a first set of wheels. Rotation of a rotor of the electric machine causes power to be transmitted to the ring gear of the differential which in turn transfers the power to the spider gears mounted on the ring gear and then onto the side gears of the axle shaft causing the first and second axle shafts to rotate in coordination. The drive torque from the electric machine may be transferred to the second set of wheels via the drive shaft and another differential unit coupled to the second set of wheels.

Upon engagement of the electric machine, at 516, the routine includes determining if a change is detected in torque delivered to the axle shafts. Once the electric machine is engaged, due to the transmission of power from the electric machine to the axle shafts, there may be at least a transient change in the torque delivered to the axle shafts. The change may include a transient decrease in torque as a new source of torque (electric machine) is being introduced. Coupling of the electric machine to the axle via the differential may cause certain transient losses in torque due to friction which may manifest as a change in torque delivered to the axle shafts. If it is determined that there is a transient change in torque delivered to the axle shafts upon operation of the axle shafts coupled to the electric machine as an e-axle, it may be inferred that the engagement of the electric machine to the e-axle via the differential has been successful and power is being transferred from the electric machine to the axle shafts. Therefore, at 518, it may be indicated that the actuation mechanism has not been degraded.

If it is determined that a transient change is not observed in torque delivered to the axle shafts, it may be inferred that power is not being transmitted from the electric machine to the axle shafts. Upon unsuccessful engagement of the electric machine, the mechanism may operate as a failsafe and the e-axle may operate as a tag axle. At 520, it may be indicated that there is a degradation in the actuation system for engagement of the electric machine to the e-axle via the differential. A flag such as a diagnostics code may be set indicating the degradation. Due to the inability of engaging the electric machine to the e-axle, at 522, the vehicle may be operated with engine torque. As the e-axle is operated as a tag axle, undesired charging of the battery coupled to the electric machine may be hindered, thereby averting degradation of the electrical components of the electric machine.

Returning to step 508, If it is determined that the conditions are not met for vehicle operation at least partially via electric machine torque, the routine may proceed to step 524. The vehicle may not be operated via electric machine torque if the current or upcoming torque demand is higher than the threshold torque demand and/or the SOC of the battery is lower than the threshold SOC. At 524, the current vehicle operation may be continued with engine torque. Air and fuel may be combusted in the engine to provide power to propel the vehicle.

At 526, the routine includes determining if charging of the battery is desired with the electric machine being engaged to the e-axle via the differential. During vehicle operation via engine torque, the on-board battery powering the electric machine may be charged. Rotation of the axle shafts while the electric machine is engaged may rotate the ring gear of the differential which in turn may cause rotation of the rotor of the electric machine. Rotation of the rotor of the electric machine may result in charging the battery. A portion of the energy supplied to the axle shafts from the engine that would be used to solely rotate the axle may be used to rotate the rotor of the electric machine, thereby reducing speed of rotation of the electric-axle and charging the battery. However, if the battery is already completely charged further attempts to charge the battery may cause degradation of the electrical components of the battery and the electric machine. Therefore, battery charging may not be desired if the battery is already fully charged.

If it is determined that battery charging is not desired, at 528, the electric machine may be disconnected from the e-axle. The electric machine torque may be reduced gradually prior to disengagement of the electric machine. In order to disconnect the electric machine from the differential to inhibit battery charging by regeneration, the first axle shaft is to be disengaged from the stub shaft which is coupled to the differential. The controller may send a signal to the actuator of the air inlet to gradually close the inlet, and inhibit air flow into the piston. The pressure in the piston of the actuation mechanism may be gradually decreased by tapering off the supply of pressurized air via the air inlet. Once the air pressure in the piston reduces to below a lower pre-determined pressure level, the spring may be decompressed which may cause the piston to move in a second direction, opposite from the first direction. The movement of the piston in the second direction may cause the disconnect clutch coupled to the piston via a stem to move away from the splines of the stub shaft, causing disengagement of the stub shaft from the first axle shaft. Upon disengagement of the disconnect clutch and the stub shaft, the flow path for charging of the battery is severed.

If it is determined that battery charging is desired, at 530, the onboard battery may be charged via rotation of the electric machine rotor with the rotation of the axle shafts. In one example, if the electric machine is not engaged to the e-axle and it is determined that charging of the on-board battery is desired during vehicle operation via engine torque, the electric machine may be engaged to the e-axle following the method elaborated in step 514 and then charging of the battery may be carried out.

In this way, system for a vehicle may comprise a pressure actuated mechanism for coupling an electric machine to an electric-axle via a differential, a first axle shaft coupled to the differential via a stub shaft and a second axle shaft directly coupled to the differential, the stub shaft including splines interlocked with a disconnect clutch coupled to the actuation mechanism. By using a pressure actuated mechanism for selectively coupling/decoupling an electric machine, operation of the e-axle may be improved and degradation of the mechanical and electronic components may be reduced.

An example method for an electric-axle comprises: selectively engaging an electric machine to a differential of the electric-axle by adjusting pressure in a piston coupled to a first axle shaft of the electric-axle via a disconnect clutch. In any preceding example, additionally or optionally, the selective engagement includes, in response to conditions being met for vehicle operation at least partially via torque supplied from the electric machine, engaging the electric machine to the differential. In any or all of the preceding examples, additionally or optionally, the selective engagement further includes, during vehicle operation via torque supplied from an engine, in response to a state of charge of an energy storage device powering the electric machine being higher than a threshold charge, disengaging the electric machine from the differential. In any or all of the preceding examples, additionally or optionally, the differential includes a ring gear engaged to a shaft of the electric machine, one or more spider gears mounted on the ring gear, a first side gear coupled to one end of a stub shaft and meshed with the one or more spider gears, and a second side gear coupled to one end of a second axle shaft and meshed with the one or more spider gears, the differential positioned between the first axle shaft and the second axle shaft. In any or all of the preceding examples, additionally or optionally, engaging the electric machine includes, increasing air pressure in the piston to move a stem coupling the piston to the disconnect clutch mounted at one end of the first axle shaft in a first direction to engage the disconnect clutch to splines of the stub shaft, and then activating the electric machine to rotate the ring gear via rotation of the shaft. In any or all of the preceding examples, additionally or optionally, engagement of the electric machine includes transmission of torque from the electric machine to the first axle shaft via each of the shaft of the electric machine, the ring gear of the differential, the one or more spider gears, the first side gear, the stub shaft, and the disconnect clutch. In any or all of the preceding examples, additionally or optionally, engagement of the electric machine further includes transmission of torque from the electric machine to the second axle-shaft via each of the shaft of the electric machine, the ring gear of the differential, the one or more spider gears, and the second side gear, wherein each of the stub-shaft, the first axle shaft, and the second axle-shaft rotates in a same direction. In any or all of the preceding examples, additionally or optionally, moving the stem in the first direction compresses a return spring coiled around the piston. In any or all of the preceding examples, additionally or optionally, disengaging the electric machine includes, reducing air pressure in the piston to decompress the return spring and move the stem in a second direction to disengage the disconnect clutch from the splines of the stub shaft, the second direction opposite to the first direction. In any or all of the preceding examples, additionally or optionally, disengagement of the electric machine includes each of the shaft of the electric machine and the ring gear being at rest without transmission of torque from the electric machine to the differential, and the stub shaft and the second axle-shaft rotating in opposite directions. In any or all of the preceding examples, the method further comprising, additionally or optionally, prior to disengaging the electric machine, reducing a torque delivered from the electric machine, and then reducing the air pressure in the piston. In any or all of the preceding examples, additionally or optionally, increasing the air pressure includes supplying pressurized air to the piston via an inlet housed in the piston and wherein reducing air pressure in the piston includes suspending supply of pressurized air to the piston. In any or all of the preceding examples, the method further comprising, additionally or optionally, in absence of a change in torque delivered to each of the first axle shaft and the second axle shaft upon engagement of the electric machine, indicating degradation of the electric-axle, and operating the vehicle solely via torque supplied from the engine.

Another system for a vehicle comprises: a pressure actuated mechanism for coupling an electric machine to an electric-axle via a differential, a first axle shaft coupled to the differential via a stub shaft, and a second axle shaft directly coupled to the differential, the stub shaft including splines interlocked with a disconnect clutch coupled to the actuation mechanism. In any preceding example, additionally or optionally, the electric machine drives a pinion of a ring gear of the differential, the ring gear coupled to the stub shaft via one or more spider gears and a first side gear. In any or all of the preceding examples, additionally or optionally, the pressure actuated mechanism includes a piston, a return spring coiled around a portion of the piston, a stem originating from the piston and terminating in the disconnect clutch, and an air inlet coupled to the piston. In any or all of the preceding examples, additionally or optionally, the piston moves to a first position upon air pressure in the piston reaching a first threshold pressure shifting the disconnect clutch to interlock with the splines of the stub shaft, and wherein the piston moves to a second position upon air pressure reducing to a second threshold pressure decoupling the disconnect clutch from the splines.

In yet another example, a system for an electric-axle for in vehicle comprises: a differential coupled to the electric-axle between a first axle shaft and a second axle shaft, a controller with computer-readable instruction stored on non-transitory memory thereof that when executed enable the controller to: operate the differential in a first mode with an electric machine mechanically coupled to each of the first axle shaft and the second axle shaft via a ring gear of the differential, the ring gear coupled to the first axle shaft via a stub shaft interlocked with a disconnect clutch, and operate the differential in a second mode without electric machine mechanically coupled to each of the first axle shaft and the second axle shaft, the ring gear detached from the first axle by decoupling of the stub shaft and the disconnect shaft. In any preceding example, additionally or optionally, the differential is operated in the first mode during operation of the vehicle at least partially via torque delivered to the differential from the electric machine or during charging of a battery coupled to the electric machine from a portion of torque delivered to the differential from an engine, and wherein the differential is operated in the second mode during operation of the vehicle via torque delivered to the differential from the engine without charging the battery. In any or all of the preceding examples, additionally or optionally, the controller includes further instruction when executed enable the controller to: transition from the first mode to the second mode by reducing air pressure in a piston coupled to the disconnect clutch causing the piston to move the disconnect clutch away from the stub shaft.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an electric-axle of a vehicle, comprising:
selectively engaging an electric machine to a differential of the electric-axle by an actuation system coupled to a first axle shaft of the electric-axle via a disconnect clutch, the electric machine driving a gear pair via a first shaft that drives a first gear, the first gear coupled to a second gear that drives a second shaft, the first and second shafts mounted perpendicular to the first axle shaft and laterally offset from one another, the second shaft being a pinion gear of the differential, wherein the actuation system includes a pressure actuated piston, and wherein the piston is mounted to move parallel with the first axle shaft and has a ramp, with an end of a mechanical switch riding on the ramp providing a feedback signal to indicate connection status of the electric machine to the electric-axle.

2. The method of claim 1, wherein the selective engagement includes, in response to conditions being met for vehicle operation at least partially via torque supplied from the electric machine, engaging the electric machine to the differential.

3. The method of claim 2, further comprising, in absence of a change in torque delivered to each of the first axle shaft and the second axle shaft upon engagement of the electric machine, indicating degradation of the electric-axle.

4. The method of claim 1, wherein the differential includes a ring gear engaged to the second shaft of the electric machine, one or more spider gears mounted on the ring gear, a first side gear coupled to one end of a stub shaft and meshed with the one or more spider gears, and a second side gear coupled to one end of a second axle shaft and meshed with the one or more spider gears, the differential positioned between the first axle shaft and the second axle shaft.

5. The method of claim 4, wherein engagement of the electric machine includes transmission of torque from the electric machine to the first axle shaft via each of the shaft of the electric machine, the ring gear of the differential, the one or more spider gears, the first side gear, the stub shaft, and the disconnect clutch.

6. The method of claim 5, wherein the actuation system includes a pressure actuated piston, and wherein disengaging the electric machine includes, reducing air pressure in the piston to decompress the return spring and move the stem in a second direction to disengage the disconnect clutch from the splines of the stub shaft, the second direction opposite to the first direction.

7. The method of claim 6, wherein disengagement of the electric machine includes each of the shaft of the electric machine and the ring gear being at rest without transmission of torque from the electric machine to the differential, and the stub shaft and the second axle-shaft rotating in opposite directions.

8. The method of claim 4, wherein engagement of the electric machine further includes transmission of torque from the electric machine to the second axle-shaft via each of the shaft of the electric machine, the ring gear of the differential, the one or more spider gears, and the second side gear, wherein each of the stub-shaft, the first axle shaft, and the second axle-shaft rotates in a same direction.

9. The method of claim 4, further comprising, prior to disengaging the electric machine, reducing a torque delivered from the electric machine, and then reducing an air pressure in the piston.

10. The method of claim 4, wherein the actuation system includes a pressure actuated piston, and wherein increasing an air pressure includes supplying pressurized air to the piston via an inlet housed in the piston and wherein reducing air pressure in the piston includes suspending supply of pressurized air to the piston.

11. A method for an electric-axle, comprising:
selectively engaging an electric machine to a differential of the electric-axle by an actuation system coupled to a first axle shaft of the electric-axle via a disconnect clutch, wherein the actuation system includes a pressure actuated piston, and wherein the selective engagement further includes, during vehicle operation via torque supplied from an engine, in response to a state of charge of an energy storage device powering the electric machine being higher than a threshold charge, disengaging the electric machine from the differential.

12. The method of claim 11, wherein engaging the electric machine includes, increasing air pressure in the piston to move a stem coupling the piston to the disconnect clutch mounted at one end of the first axle shaft in a first direction to engage the disconnect clutch to splines of the stub shaft, and then activating the electric machine to rotate the ring gear via rotation of the shaft and wherein moving the stem in the first direction compresses a return spring coiled around the piston.

13. A system for an electric-axle in a vehicle, comprising:
a differential coupled to the electric-axle between a first axle shaft and a second axle shaft; and
a controller with computer-readable instruction stored on non-transitory memory thereof that when executed enable the controller to:
operate the differential in a first mode with an electric machine mechanically coupled to each of the first axle shaft and the second axle shaft via a ring gear of the differential, the ring gear coupled to the first axle shaft via a stub shaft interlocked with a disconnect clutch; and operate the differential in a second mode without electric machine mechanically coupled to each of the first axle shaft and the second axle shaft, the ring gear detached from the first axle by decoupling of the stub shaft and the disconnect shaft, wherein the differential is operated in the first mode during operation of the vehicle at least partially via torque delivered to the differential from the electric machine or during charging of a battery coupled to the electric machine from a portion of torque delivered to the differential from an engine, and wherein the differential is operated in the second mode during operation of the vehicle via torque delivered to the differential from the engine without charging the battery.

14. The system of claim 13, wherein the controller includes further instruction when executed enable the controller to: transition from the first mode to the second mode by reducing air pressure in a piston coupled to the disconnect clutch causing the piston to move the disconnect clutch away from the stub shaft.

\* \* \* \* \*